Feb. 6, 1968 R. J. DAIN 3,367,647
TRUNNION RING FOR TILTABLE CONVERTOR
Filed Dec. 16, 1963

INVENTOR
R. J. Dain
BY
ATTORNEY

United States Patent Office 3,367,647
Patented Feb. 6, 1968

1

3,367,647
TRUNNION RING FOR TILTABLE CONVERTOR
Richard James Dain, London, England, assignor to Davy and United Engineering Company, Limited, Sheffield, England, a British company
Filed Dec. 16, 1963, Ser. No. 330,891
Claims priority, application Great Britain, Dec. 21, 1962, 48,430/62
4 Claims. (Cl. 266—36)

This invention relates to supporting structures, particularly for steel-making vessels. The invention is applicable to oxygen-converters, such as those known as LD converters and Kaldo converters.

In accordance with one aspect of the present invention, a supporting structure for a steel-making vessel comprises a frame in which the vessel is rotatably mounted and which is supported by journals removably received in the frame.

In a preferred form the invention provides a supporting structure for a steel-making vessel comprising a frame in which the vessel is rotatably mounted for rotation about its axis, and which is supported by journals received in self-aligning bearings in the frame, for rotation about an axis normal to the axis of the vessel. By journal-mounting the frame, the construction is simplified and the bending moments in the frame due to the support are reduced to a minimum.

Figure 1:
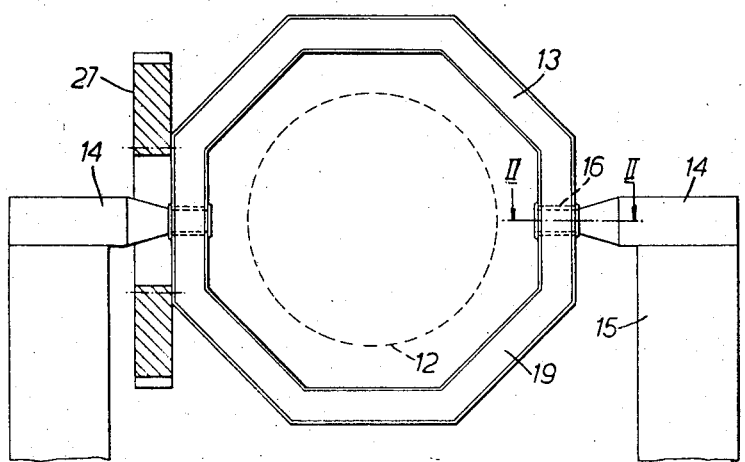
Figure 2:
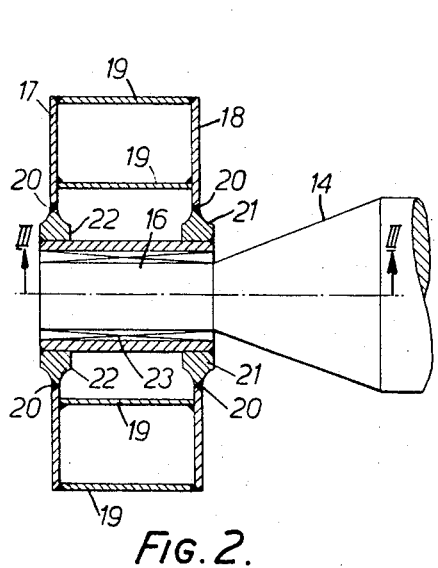
Figure 3:
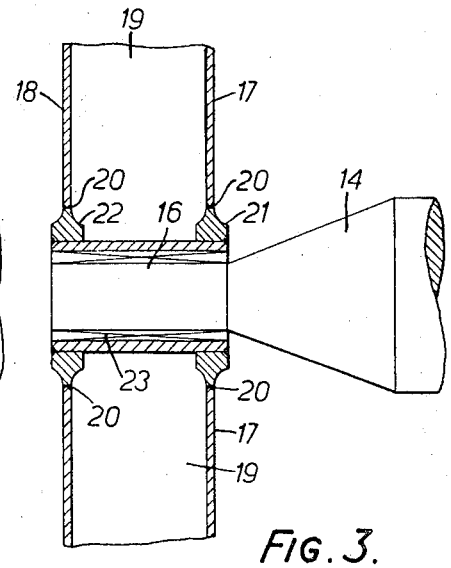

The invention will be more readily understood, by way of example only, from the following description of a supporting structure for a steel-making vessel, reference being made to the accompanying drawings, in which:

FIGURE 1 is a side view of the supporting structure, when the frame is turned to bring the axis of the vessel to the horizontal, FIGURE 2 is a section on enlarged scale on the line II—II of FIGURE 1, and FIGURE 3 is a section on the line III—III of FIGURE 2.

The converter vessel, which is indicated schematically at 12 is carried by rollers in a ring-frame 13, so that the vessel can turn about its axis. The vessel must be capable of rotation about an axis normal to the vessel's axis, to permit tilting of the vessel charging and tapping. For this purpose, the frame 13 is carried on journals 14, which enter the frame.

Each journal 14 is bolted to a prestressed pillar 15 and its reduced end 16 is carried in bearings in the frame 13. As shown in FIGURES 2 and 3, the frame consists of a pair of plates 17, 18 which are secured together at intervals by welded webs 19. Where the journal 14 enters the frame 13, the plates 17, 18 are welded at 20 to a pair of axially aligned sleeves 21, 22 respectively. Each of these sleeves supports a self-aligning roller bearing or sleeve bearing indicated diagrammatically at 23, the reduced portion 16 of the journal 14 being received in the bearing 23.

The frame 13 is driven about the axis of the journals by means of a gear ring 27 mounted on the frame and driven gear, not shown, meshing with the gear ring.

At least one of the journals 14, is axially movable in its bearing 23 to allow for thermal expansion of the frame.

Previously, the ring has been supported by stub-shafts secured to the frame and carried in bearings mounted in pillars. This arrangement has caused complication in manufacture of the frame and has given rise to unduly high bending moments in the frame itself. The present construction has the advantage of simplicity of manufacture and small bending moments generated in the frame 13.

I claim:
1. In combination a frame for supporting a steel making vessel for rotation within the frame about the axis of the vessel, stationary shafts, each including a journal on which said frame is rotatably supported for rotation about an axis perpendicular to the axis of the vessel, and self-aligning bearings carried by said frame and in which said journals are removably received.

2. Apparatus for steel making comprising a steel making vessel, a frame in which the vessel is mounted for rotation about its own axis, self-aligning bearings in the frame, prestressed pillars and stationary journals secured to said pillars, said journals having reduced end portions, which are received in said bearings and on which the frame and vessel are mounted to pivot together about an axis normal to the vessel axis.

3. A supporting structure according to claim 1 including a gear wheel secured to the frame by means of which the frame may be rotated about the journal axis.

4. A supporting structure according to claim 1 in which at least one of the journals is axially movable in its bearings to allow for thermal expansion of the frame.

References Cited
UNITED STATES PATENTS

| 855,603 | 6/1907 | Adams | 266—36 |
| 3,144,496 | 8/1964 | Langlitz | 266—36 |
| 3,146,983 | 9/1964 | Johnson | 266—39 X |
| 3,191,921 | 6/1965 | Johnson | 266—36 |
| 3,195,875 | 7/1965 | Mummert | 266—36 |

J. SPENCER OVERHOLSER, *Primary Examiner.*

E. MAR, J. M. ROMANCHIK, *Assistant Examiners.*